(12) United States Patent
Oba et al.

(10) Patent No.: US 6,260,929 B1
(45) Date of Patent: Jul. 17, 2001

(54) WHEEL BALANCE WEIGHT AND A METHOD OF MANUFACTURING THE SAME

(75) Inventors: Kentaro Oba, Tokyo; Saburo Maruyama, Ayase, both of (JP)

(73) Assignee: Topy Koygo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/348,488

(22) Filed: Jul. 7, 1999

(51) Int. Cl.$^7$ .................................................. B60B 1/00
(52) U.S. Cl. .................................................. 301/5.21
(58) Field of Search .................... 301/5.21, 5.22, 301/65

(56) References Cited

U.S. PATENT DOCUMENTS

| | | |
|---|---|---|
| 2,029,132 | 1/1936 | Skelton . |
| 2,640,727 | * 6/1953 | Kennedy ............................. 301/5.21 |
| 3,154,347 | * 10/1964 | Griffith ............................... 301/5.21 |
| 3,177,039 | * 4/1965 | Skidmore ........................... 301/5.21 |
| 3,633,263 | * 1/1972 | Hoekseman ........................ 301/5.21 |
| 3,905,648 | * 9/1975 | Skidmore ........................... 301/5.21 |
| 3,960,409 | 6/1976 | Songer . |

FOREIGN PATENT DOCUMENTS

| | | |
|---|---|---|
| 84817/75 | 3/1977 | (AU) . |
| 856671 | * 11/1970 | (CA) ................................... 301/5.21 |
| 1 777 597 | 9/1958 | (DE) . |
| 298 05 452 U | 8/1998 | (DE) . |
| 2 276 510 | 1/1976 | (FR) . |
| 92/00471 | 1/1992 | (WO) . |
| 99/00609 | 1/1999 | (WO) . |

* cited by examiner

*Primary Examiner*—S. Joseph Morano
*Assistant Examiner*—Long Bao Nguyen
(74) *Attorney, Agent, or Firm*—Pillsbury Winthrop LLP; Intellectual Property

(57) ABSTRACT

A wheel balance weight including a plurality of weight bodies of at least one kind and an adhesive double-coated tape. Each of the plurality of weight bodies is made from a metal other than lead and the side surfaces of adjacent weight body are tapered. The balance weight may include one or more weight bodies each having a predetermined weight of W and W/n. The balance weight may include one or more weight bodies each having a predetermined weight of W and a summation of W/n and W. A method of manufacturing a balance weight includes: producing a bar material having tapered surfaces at opposite sides, cutting the bar material into a plurality of weight bodies, and attaching the plurality of weight bodies to an adhesive double-coated tape. Alternately, a method of manufacturing a balance weight may include: producing a bar material, punching the bar material by a punch and a die so that cut planes are tapered thereby manufacturing a plurality of weight bodies, and attaching the plurality of weight bodies to an adhesive double-coated tape.

8 Claims, 4 Drawing Sheets

ROLLING OR EXTRUDING

CUTTING

WHEEL BALANCE WEIGHT AND A METHOD OF MANUFACTURING THE SAME

BACKGROUND OF THE INVENTION

1. Field of the Invention

The present invention relates to a wheel balance weight which is to be attached to a wheel by adhesion (hereinafter, an adhesion-type balance weight) and a method of manufacturing the same.

2. Description of Related Art

In an automobile wheel assembly including a wheel and a tire, there is a potential for a dynamic imbalance in weight to exist when the wheel is rotated. Generally, in order to compensate for this imbalance, the wheel is provided with a balance weight.

Increasingly, an adhesion-type balance weight has been used for the following reasons:

(1) From the standpoint of wheel design, a clip-type balance weight (a balance weight to be attached to a wheel by a clip) which is disposed on the visible design surface of the wheel has been replaced by the adhesion-type balance weight which can be attached to an inside surface of a non-visible portion of the wheel.

(2) It is often difficult to attach the clip-type balance weight to a flange portion of the wheel, because the flange has a specialized configuration.

(3) Due to improvement of wheel and tire technology, the weight of the balance weight is decreased, which enables the use of an adhesion-type balance weight.

A conventional adhesion-type balance weight includes a weight body manufactured by cast and made from Pb (lead) having a bar configuration, and an adhesive double-coated tape to which the weight body is attached. A separating sheet protects the adhesion surface of the tape. The sheet is removed when the balance weight is used.

In order to keep the adhesive strength of the balance weight to the wheel, it is preferable that the surface of the balance weight which is attached to the wheel has the same curvature as that of the inside surface of the wheel. Since Pb has high plasticity, the balance weight can be easily formed, even manually, to match the same curvature as that of the inside surface of the wheel.

Recently, there has been a trend to avoid the industrial use of heavy metals such as Pb for the purpose of an environmental protection. Thus, the Pb of the balance weight is apt to be substituted for other materials.

As an alternative, from an industrial viewpoint materials such as Fe or Cu can be used which are inexpensive, environmentally friendly and have a relatively high density.

In cases where the adhesion-type balance weight is made from the materials such as Fe and Cu, which are harder than Pb, it is difficult to form the balance weight to the same curvature as that of the inside surface of the wheel by manual force.

Further, since the weight of the balance weight is weighed in standard weights which are defined in 5 gram intervals from 5 g to 100 g, many balance weights of 5, 10, 15, . . . , 100 g need to be prepared.

Some conventional adhesion-type balance weights which are made of Pb have slits at each interval of the unit weight. Thus, each slit allows the balance weight to be easily cut according to the required weight. Balance weights made from Pb are softer and are easily cut. Further, no problems with corrosion occur at the cut plane. On the contrary, a balance weight made from steel requires a greater cutting force. In addition, there is a possibility of corrosion generation if a bare surface of a steel balance weight is exposed, which requires a surface re-treatment after cutting.

SUMMARY OF THE INVENTION

An object of the present invention is to provide a wheel balance weight which can alleviate environmental concerns by substituting another material for lead which can be easily cut, and a method of manufacturing the balance weight.

The above-described object can be achieved by the following present invention.

A wheel balance weight includes a plurality of weight bodies each having two side surfaces and a single adhesive double-coated tape having a first surface to which the plurality of weight bodies are attached and a second surface opposite to the first surface. Each of the plurality of weight bodies is made from a metal other than lead, and the side surfaces of adjacent weight bodies are spaced apart from each other except for portions of the side surfaces where the adjacent weight bodies are attached to the first surface of the adhesive double-coated tape. The balance weight is attached to a wheel at the second surface of the adhesive double-coated tape.

Each of the side surfaces of the adjacent weight bodies may be tapered. In addition, each weight body of the plurality of weight bodies may have the same weight and configuration.

Further, the plurality of weight bodies may include one or more weight bodies of a first kind having a first weight of W and one or more weight bodies of a second kind having a second weight of W/n, wherein n is an integer equal to or greater than 2. The weight bodies of the first kind and the second kind are arranged parallel to each other.

The plurality of weight bodies may include one or more weight bodies of a first kind having a first weight of W and one or more weight bodies of a second kind having a second weight equal to the summation of at least one W/n and W. Here, n is an integer equal to or greater than 2, and the weight bodies of the first kind and the second kind are arranged parallel to each other.

A method of manufacturing a wheel balance weight including: (1) producing a bar material which may have two side surfaces each surface tapered by rolling or extruding; (2) cutting the bar material into a plurality of the weight bodies; and (3) attaching the plurality of weight bodies to a first surface of the single adhesive double-coated tape, positioning the tapered surfaces of the adjacent weight bodies towards each other.

The bar material may be cut by a punch so that cut planes of the bar material are tapered thereby manufacturing a plurality of weight bodies having tapered sides surfaces.

Finally, the bar material may be cut by a punch and a die so that cut planes of the bar material are tapered by maintaining a distance between the punch and the die thereby manufacturing a plurality of weight bodies having tapered side surfaces.

Since the wheel balance weight having any one of the above-described features is not made of lead, the balance weight is environmentally friendly. Further, since the balance weight is separated into a plurality of weight bodies, the balance weight can be easily cut by hands or with scissors.

The wheel balance weight may be constructed of a combination of one or more weight bodies each having a weight of W and one or more weight bodies each having a weight of W/n arranged parallel to each other. Thus, the total weight of the balance weight can be determined more accurately as compared to a case where the balance weight is constructed of a plurality of weight bodies, each having a weight of W only.

Additionally, the wheel balance weight may be constructed of a combination of one ore more weight bodies each having a weight of W and one or more weight bodies each having a summation of at least one W/n and W arranged parallel to each other. Thus, the total weight of the balance weight can be determined more accurately as compared to the balance weights constructed of a plurality of weight bodies, each having a weight of W only.

Since the tapered surfaces of the weight body may be formed at opposite sides of the bar material when the bar material is rolled or extruded, the manufacturing method is highly productive.

Also, the manufacturing method is very productive, since the tapered surfaces of the weight bodies may be formed at cut planes of the bar material by a punch.

Finally, adjusting the distance between the punch and the die, a weight body having the tapered surfaces (collapse planes) of the same configuration may be produced more efficiently.

BRIEF DESCRIPTION OF THE DRAWINGS

The objects, features, and advantages of the present invention will become more apparent and will be more readily appreciated by the following detailed description of the preferred embodiments illustrated by the accompanying drawings, in which.

DETAILED DESCRIPTION OF THE PREFERRED EMBODIMENTS

Figure 1:
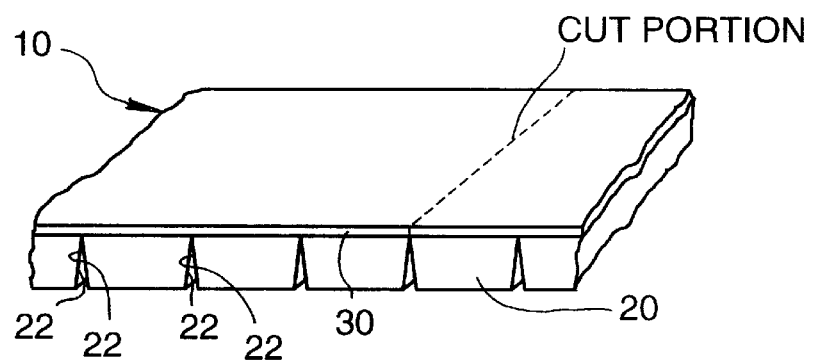
FIG. 1 is a perspective view of a balance weight according to an embodiment of the present invention.
Figure 2:
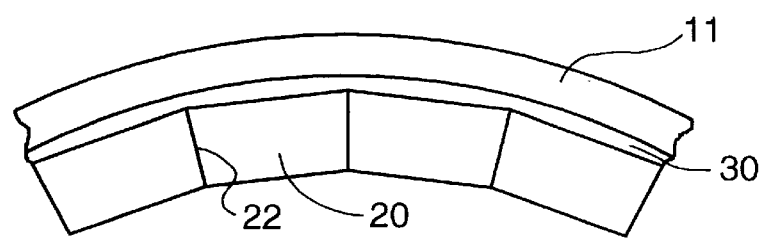
FIG. 2 is an elevated partial front view of the balance weight of FIG. 1 at a state where the balance weight is attached to an inside surface of a wheel.
Figure 3:
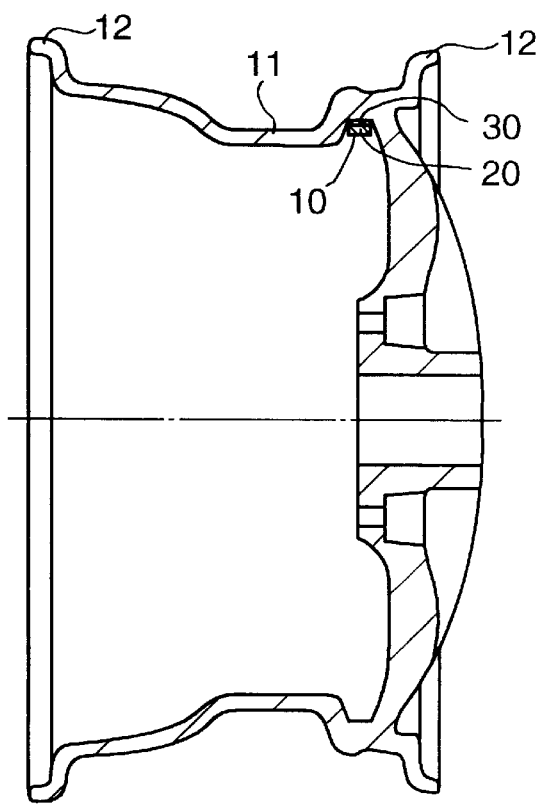
FIG. 3 is a cross-sectional view of the balance weight of FIG. 1 at a state where the balance weight is attached to the inside surface of the wheel.
Figure 4:
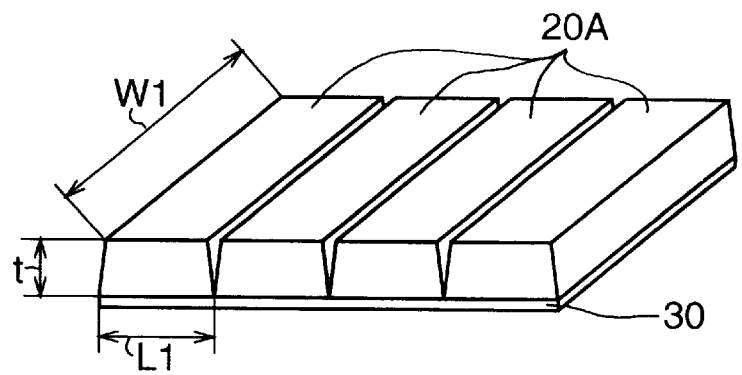
FIG. 4 is a perspective view of a balance weight according to the first embodiment the present invention.
Figure 5:
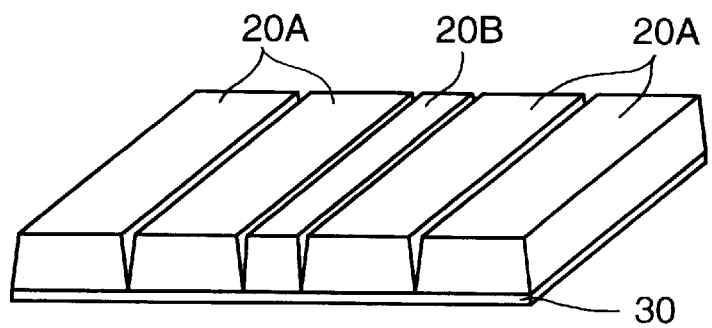
FIG. 5 is a perspective view of a balance weight according to the second embodiment the present invention.
Figure 6:
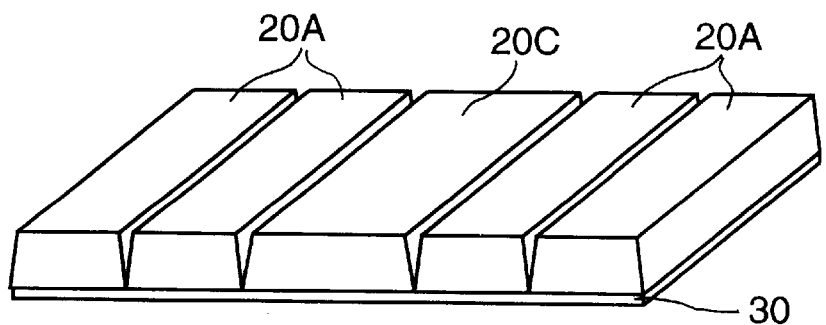
FIG. 6 is a perspective view of a balance weight according to the third embodiment the present invention.
Figure 7A:
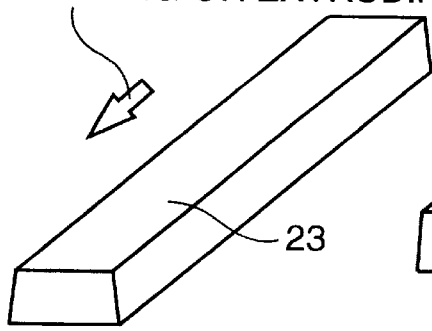
FIG. 7a is a perspective view of the manufacturing method of rolling or extruding bar material according to the fourth embodiment of the present invention.
Figure 7B:
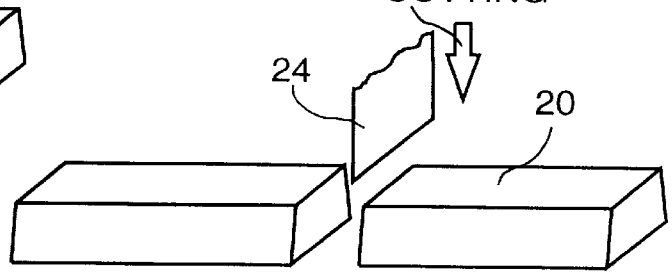
FIG. 7b is a perspective view of the manufacturing method of the cutting step performed on a weight body according to the fourth embodiment of the present invention.
Figure 8A:
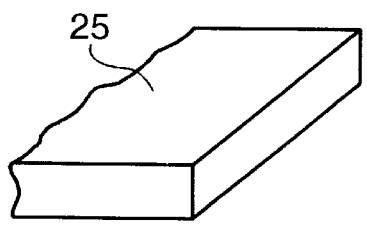
FIG. 8a is a perspective view of the manufacturing method of rolling or extruding bar material according to the fifth embodiment of the present invention.
Figure 8B:
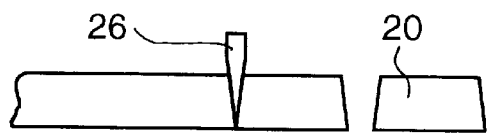
FIG. 8b is a perspective view of manufacturing method of the punching step performed on a weight body according to the fifth embodiment of the present invention.
Figures 13A, 13B, 13C:
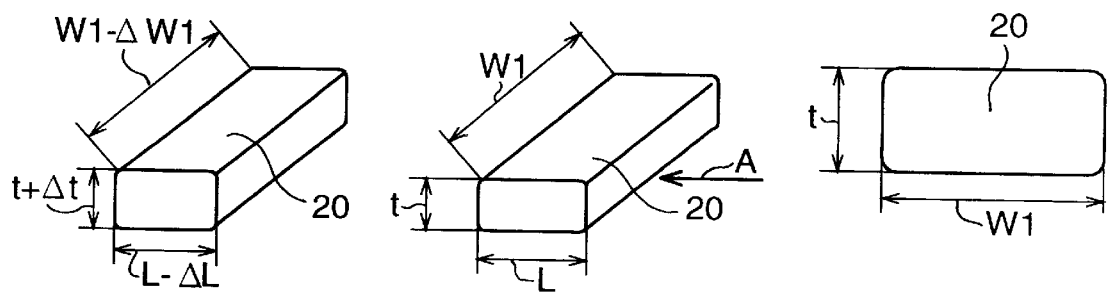
FIG. 13a is a perspective view of a weight body before forging applicable to any one of the fourth, the fifth, and the sixth embodiments of the present invention.
FIG. 13b is a perspective view of a weight body after forging applicable to any one of the fourth, the fifth, and the sixth embodiments of the present invention.
FIG. 13c is a side view of the weight body as viewed from direction A of FIG. 13b.

FIGS. 1–3 illustrate a balance weight characteristic of any embodiment of the present invention. FIG. 4 illustrates the first embodiment, FIG. 5 illustrates the second embodiment, and FIG. 6 illustrates the third embodiment of the present invention. FIGS. 7a and 7b illustrate a manufacturing method characteristic of the fourth embodiment of the present invention. FIGS. 8a and 8b illustrate the fifth embodiment, and FIGS. 9–12 illustrate the sixth embodiment of the manufacturing method of the present invention. FIGS. 13a, 13b and 13c illustrate a method of deburring applicable to the fourth, the fifth, and the sixth embodiments of the present invention. Structural portions common to all of the embodiments of the present invention are denoted with like reference numerals throughout all of the embodiments of the present invention.

Structural features common to all balance weight embodiments according to any embodiment of the present invention will be explained with reference to FIGS. 1–3.

Balance weight 10 includes a plurality of weight bodies 20 each having a predetermined weight of at least one kind, and a single adhesive double-coated tape 30 having a first surface to which the plurality of weight bodies 20 are attached. The balance weight 10 is attached to an inside surface of a wheel 11 at a surface opposite to the first surface of the adhesive double-coated tape 30. Preferably, the balance weight 10 is attached to the wheel 11 at a position invisible or less visible from the outside. Further, it is preferable that the balance weight 10 (which may be non-tapered) is attached to the wheel 11 at a portion extending straight in an axial direction. Unlike a conventional balance weight, the attached portion of the balance weight 10 to the wheel 11 is not limited to an inside surface of a wheel flange 12.

The weight body 20 is made from metal other than lead. The metal preferably has a higher melting point than lead and a relatively high density, for example, steel or copper. The weight bodies 20 are manufactured by cutting a metal bar at predetermined spacings. The opposing side surfaces 22 of adjacent weight bodies 20 are spaced apart from each other except for end portions of the side surfaces 22 where the weight bodies 20 are attached to the adhesive double-coated tape 30. The opposing side surfaces 22 of the adjacent weight bodies 20 may be tapered 22 (denoted with the same reference numeral as the side surface 22 because it is identical to the side surface). However, the side surface is not necessarily tapered. An example of a tapered side surface follows. There is no interspace between the opposing tapered surfaces 22 at the end portions of the tapered surfaces where the adjacent weight bodies are attached to the first surface of the adhesive double-coated tape 30. The further the tapered surfaces are from the tape 30, the wider the interspace is. A width of the weight body 20 (that is, the width of the weight body 20 in a circumferential direction of the wheel when attached to the wheel 11) is designed so that the tape 30 is attached to the inside surface of the wheel 11 with a sufficient adhesive strength even at the center width of the weight body 20.

When the balance weight 10 is shaped to conform to the inside surface of the wheel, the adjacent side surfaces (the opposing tapered surfaces) 22 of the weight bodies 20 contact each other, eliminating spaces between the adjacent weight bodies 20. Geometrically, a taper angle is determined corresponding to each curvature. Practically, since the tape 30 is extendable and shrinkable and operates as an absorber, one taper angle may be selected to conform to surfaces having various curvatures.

Structural features unique to a balance weight according to each embodiment of the wheel balance weight of the present invention are described as follows.

According to the first embodiment of the balance weight 10, as shown in FIG. 4, each of the weight bodies 20A has a predetermined weight W of one kind. Preferably, the predetermined weight W of the weight body 20 is selected to be the minimum of standard weights. Standard weights are normally defined in 5 gram intervals from 5 g to 100 g. Thus, the weight of W is normally about 5 g. In this case, the balance weight is cut at the tape 30 to correspond to a required weight.

The second embodiment of the balance weight 10, as shown in FIG. 5, includes one or more weight bodies 20A of a first kind having a first weight of W and one or more weight bodies 20B of a second kind having a second weight of W/n (in which n is an integer equal to or greater than 2, for example, 2). The weight bodies 20A and the weight bodies 20B are parallel to each other. Preferably, W is selected to be the minimum of standard weights which are normally determined at intervals of 5 gram from 5 g to 100 g. Thus, the weight of W is normally about 5 g. In a case where W is 5 g and n is 2 in the weight of W/n, the total weight of the balance weight can be determined with an accuracy of up to 2.5 g. Because the side surfaces are tapered, if the balance weight 10 is constructed of a plurality of weight bodies 20B each having weight of W/n, the longitudinal length of the balance weight 10 (i.e., in a width direction of each of the weight bodies 20B) would be longer than a case where the balance weight 10 is constructed of a plurality of weight bodies 20A each having the weight of W only, when the total weight of the balance weight is fixed. In this case, the longer the balance weight 10 is, the harder it is to handle. For this reason, it is preferable that the length of the balance weight 10 is short. In the second embodiment of the present invention, by reducing the number of weight bodies 20B, for example, to 1, the longitudinal length of the balance weight 10 is kept from being unnecessarily long. In this instance, it is preferable that the one weight body 20B having a weight of W/n is positioned between a plurality of weight bodies 20A each having a weight of W and is attached to the first surface of the adhesive double-coated tape 30 thereby constructing the balance weight 10. Thereafter, the balance weight 10 is attached to the inside surface of the wheel 11.

The third embodiment of balance weight 10, as shown in FIG. 6, the balance weight 10 includes one or more weight bodies 20A of a first kind having a first weight of W and one ore more weight bodies 20C of a second kind having a second weight of summation of at least one W/n and W (in which n is an integer equal to or greater than 2, for example, 2). The weight bodies 20A and 20C are parallel to each other. Preferably, the weight of W is selected to be the minimum of standard weights which range from 5 g to 100 g in 5 gram intervals. Thus, the weight of W is normally about 5 g. The technical advantages of the third embodiment of present invention are equivalent to those of the second embodiment. In order to keep the length of the balance weight from being unnecessarily long, it is preferable that the weight body 20C having the weight of W/n and W is arranged between a plurality of weight bodies 20A each having a weight of W and are attached to the first surface of the adhesive double-coated tape 30, thereby constructing the balance weight 10. Thereafter, the balance weight 10 is attached to the inside surface of the wheel 11.

The fourth embodiment of the present invention, as illustrated in FIGS. 7a and 7b, includes a method of manufacturing the balance weight 10. The balance weight 10 includes a plurality of weight bodies 20 each having a predetermined weight of at least one kind and a single adhesive double-coated tape 30. Each of the plurality of weight bodies 20 is made from a metal other than lead. The side surfaces of the adjacent weight bodies are tapered 22.

The manufacturing process includes the steps of: (1) producing a bar material 23 having two side surfaces each tapered by rolling or extruding (the first process as shown in FIG. 7a); (2) cutting the bar material 23, for example, with a slitter 24 (which may be a punch or shear cutter) into a plurality of weight bodies 20 (the second process as shown in FIG. 7b); and (3) attaching the plurality of weight bodies 20 to a first surface of the adhesive double-coated tape 30, thereby positioning the tapered surfaces 22 of the adjacent weight bodies 20 towards each other. Before attaching the weight bodies 20 to the tape 30, a balancing test for a wheel mounted with a tire is conducted. By the test, it is determined where to attach a balance weight and how much weight is required. Then, a weight balance having the required weight is manufactured by the above process.

The production of a tapered surface 22 by rolling or extruding is higher than forming the tapered surface 22 by machining or the like. Further, the manufacturing process of rolling or extruding and cutting is very productive compared to molding the bar materials in a cast one at a time. However, the manufacture of the weight body 20 of the balance weight 10 of the present invention is not limited to rolling or extruding, but may be manufactured by molding.

The fifth embodiment of the present invention, as illustrated in FIGS. 8a and 8b, includes a method of manufacturing the balance weight 10, wherein the bar material 25 is cut with a punch 26 so that cut planes of the bar material 25 are tapered thereby manufacturing a plurality of weight bodies 20 having tapered side surfaces (the second process as shown in FIG. 8b).

The production of a tapered surface 22 by cutting with a punch 26 at the step of cutting, the productivity is higher compared to machining or the like.

FIGS. 9–12 illustrate a manufacturing method according to the sixth embodiment of the present invention.

Figure 9:
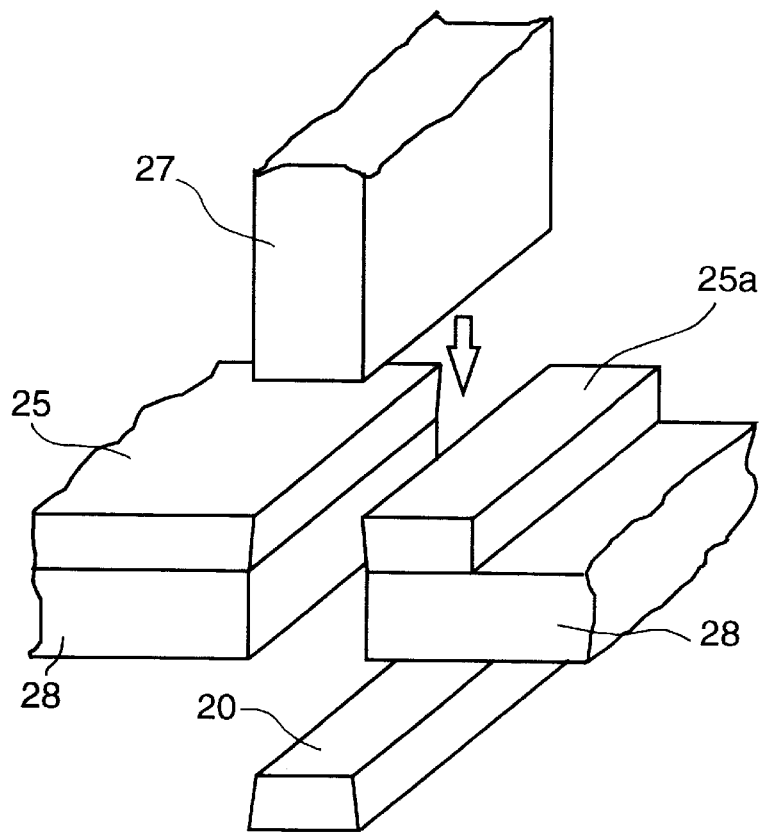
FIG. 9 is perspective view illustrating a punching step performed on a weight body according to the sixth embodiment of the present invention.

In the sixth embodiment illustrated in FIG. 9 provides a method of manufacturing balance weight 10. The balance weight 10 includes a plurality of weight bodies 20 each having a predetermined weight of at least of one kind and a single adhesive double-coated tape 30 to which the plurality of weight bodies 20 are attached. Each of the plurality of weight bodies 20 is made from a metal other than lead, and each of side surfaces of adjacent weight bodies is tapered 20a and has a trapezoidal configuration. The process includes the steps of: (1) producing a bar material 25 by rolling or extruding (identical to the first process of FIG. 8a); (2) punching the bar material 25 by a punch 27 and a die 28 thereby manufacturing a plurality of weight bodies 20 (as shown in FIG. 9); and (3) attaching the plurality of weight bodies 20 to a first surface of the adhesive both-coated tape 30, thereby positioning the tapered surfaces 20a of the adjacent weight bodies 20 towards each other.

The tapered surface 20a of the weight body 20 of the sixth embodiment is formed by maintaining a distance C between the punch 27 and the die 28 when punching. Waste material 25a is scrapped.

Figure 10:
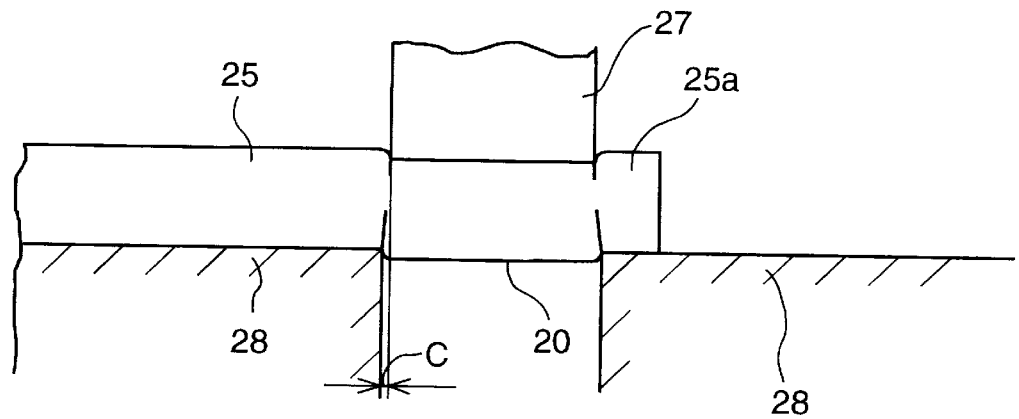
FIG. 10 is a cross-sectional view illustrating the punching step performed on a weight body according to the sixth embodiment of the present invention.
Figure 11:
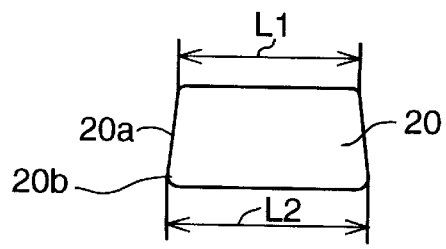
FIG. 11 is a cross-sectional view of the weight body manufactured according to the sixth embodiment of the present invention.
Figure 12:
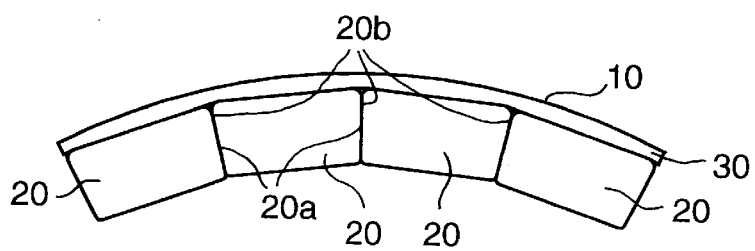
FIG. 12 is a cross-sectional view of the balance weight manufactured according to the sixth embodiment of the present invention at a state where the balance weight is shaped to fit an inside surface of the wheel.

In particular, as illustrated in FIGS. 9 and 10, the bar material 25 is punched using the punch 27 and the die 28 with the distance C held therebetween. Then, the punched product (weight body) 20 is dropped below the die 28. As illustrated in FIG. 11, the cut plane of the product (weigh body) 20 forms a tapered surface 20a. As a result, the weight body 20 having a curved configuration 20b at a corner of a bottom portion is manufactured.

Tests were conducted by the inventors by attaching the balance weight of the present invention to an automobile wheel having a size from 12 inches to 18 inches. The test results confirm that when the thickness of the weight body 20 was in the range of 2–5 mm, the tapered surface 20a required for applying the weight body 20 to the wheel was formed in the side surfaces of the weight body 20. This was true, even though the differential between a length L1 of an upper side and a length of L2 of a lower side was about 0.1–0.8 mm as shown in FIG. 11.

By using the manufacturing method of the weight body 20 as discussed above and conventional punching technology, it is possible to efficiently manufacture a balance weight which is highly accurate both in configuration and dimension.

In the fourth, the fifth and the sixth embodiments of the present invention, the product may be reworked into a predetermined configuration by forging (which may be cold forging, warm forging or hot forging), This step may be added after manufacturing and cutting the bar material. Forging removes burr and sagging at the ends of the bar material. This step and cutting may be performed at the same time.

FIGS. 13a–13c illustrate reworking and deburring performed during forging. Before forging a weight body 20 has a thickness of t+Δt, a length of L−ΔL, and a width of $W_1-\Delta W_1$. The weight body 20 is reworked into the product having a thickness of t, a length of L, and a width of $W_1$. At the same time, a corner of a bottom portion of the weight body 20 is rounded. Forging the weight balance is highly productive compared to molding, machining or the like.

The wheel balance of the present invention offers the following technical advantages:

First, since the balance weight is made from metal other than lead, environmental concerns associated with a balance weight made from lead are alleviated.

Second, because the side surfaces of adjacent weight bodies are tapered and spaced apart from each other except for the end portions of the side surfaces, the following technical advantages are obtained:

(a) Since the adhesive double-coated tape to which a plurality of body weights are attached is extendable, the balance weight can be easily formed to fit the inside surface of the wheel.

(b) Since no spaces exist between the weight bodies when attached to the inside surface of the wheel, the accumulation of contaminant, dust and the like is effectively suppressed.

(c) Since the adhesive double-coated tape is extendable, even if only one taper angle is provided, the balance weight can fit well to wheels having various curvatures.

Third, because the balance weight is separated into a plurality of the weight bodies, the following technical advantages are obtained:

(a) The balance weight can be cut at the adhesive double-coated tape to correspond to a required weight, and then used.

(b) The adhesive double-coated tape can be easily cut by manual force.

(c) Since a bare metal surface is not revealed when the adhesive double-coated tape is cut, corrosion concerns are eliminated.

(d) Since the balance weight is separated into a plurality of the weight bodies, upon an impact a balance weight attached to a wheel is flexible by virtue of independent, movable bodies, so that the balance weight remains attached even when mechanically shocked.

The manufacturing methods of the present invention offer the following technical advantages:

First, because the tapered surfaces of the bar material at the opposite sides are formed by rolling or extruding and by cutting the bar material into a plurality of the weight bodies, the manufacture of a weight body having tapered surfaces is highly productive.

Second, since the bar material is cut by a punch so that the cut planes of the bar material are tapered, the manufacturing process is highly productive.

Third, by punching the bar material with a punch and a die so that the cut planes of the bar material are tapered by maintaining a distance between the punch and the die, a weight body having the tapered surfaces can be mass-produced accurately and stably.

Although the present invention has been described with reference to specific exemplary embodiments, it will be appreciated in the art that various modifications and alterations can be made to the particular embodiments shown, without materially departing from the novel teachings and advantages of the present invention. Accordingly, it is to be understood that all such modifications and alterations are included within the spirit and scope of the present invention as defined by the following claims.

What is claimed is:

1. A wheel balance weight, comprising:

a plurality of weight bodies each having two side surfaces at opposite ends of each of said plurality of weight bodies in a circumferential direction of a wheel to which said wheel balance weight is to be attached, and a wheel opposing surface extending straight between said two side surfaces; and a single adhesive double-coated tape having a first surface to which said plurality of weight bodies are attached and a second surface opposite to said first surface, wherein each of said plurality of weight bodies is made from steel, and said side surfaces of adjacent weight bodies are spaced apart from each other except for end portions of said side surfaces adjacent to said wheel opposing surface where said adjacent weight bodies are attached to said first surface of said adhesive double-coated tape, and a width of each of said plurality of weight bodies between said two side surfaces is determined so that each of said plurality of weight bodies is attached via said adhesive double-coated tape to the wheel with a sufficient adhesive strength even at a center of said width, and said balance weight is attached to the wheel at said second surface of said adhesive double-coated tape.

2. A wheel balance weight according to claim 1, wherein said side surfaces of said adjacent weight bodies are tapered.

3. A wheel balance weight according to claim 1, wherein said plurality of weight bodies have the same weight and the same configurations as each other.

4. A wheel balance weight according to claim 1, wherein said plurality of weight bodies include:
one or more weight bodies of a first kind having a first weight of W; and
one or more weight bodies of a second kind having a second weight of W/n, wherein n is an integer equal to or greater than 2, and said weight bodies of the first kind and the second kind are arranged parallel to each other.

5. A wheel balance weight according to claim 1, wherein said plurality of weight bodies include:
one or more weight bodies of a first kind having a first weight of W; and
one or more weight bodies of a second kind having a second weight of summation of al least one W/n and W, wherein n is an integer equal to or greater than 2, and said weight bodies of the first kind and the second kind are arranged parallel to each other.

6. A method of manufacturing a wheel balance weight having a plurality of steel weight bodies, each having two side surfaces at opposite ends of each of said plurality of weight bodies in a circumferential direction of a wheel to which said wheel balance weight is to be attached, and a wheel opposing surface extending straight between said two side surfaces, wherein a width of each of said plurality of weight bodies between said two side surfaces is determined so that each of said plurality of weight bodies is attached via an adhesive double-coated tape to the wheel with a sufficient adhesive strength even at a center of said width, said method comprising:
producing a bar material having two side surfaces each formed in a tapered surface by any one of rolling and extruding;
cutting said bar material into a plurality of weight bodies; and
attaching said plurality of weight bodies to a first surface of a single adhesive double-coated tape, positioning said tapered surfaces of said adjacent weight bodies towards each other.

7. A method of manufacturing a wheel balance weight having a plurality of steel weight bodies, each having two side surfaces at opposite ends of each of said plurality of weight bodies in a circumferential direction of a wheel to which said wheel balance weight is to be attached, and a wheel opposing surface extending straight between said two side surfaces, wherein a width of each of said plurality of weight bodies between said two side surfaces is determined so that each of said plurality of weight bodies is attached via an adhesive double-coated tape to the wheel with a sufficient adhesive strength even at a center of said width, said method comprising:
producing a bar material by any one of rolling and extruding; cutting said bar material by a punch so that cut planes of said bar material are tapered thereby manufacturing a plurality of weight bodies having tapered side surfaces; and
attaching the plurality of weight bodies to a first surface of a single adhesive double-coated coated tape, positioning said tapered surfaces of adjacent weight bodies towards each other.

8. A method of manufacturing a wheel balance weight having a plurality of steel weight bodies, each having two side surfaces at opposite ends of each of said plurality of weight bodies in a circumferential direction of a wheel to which said wheel balance weight is to be attached, and a wheel opposing surface extending straight between said two side surfaces, wherein a width of each of said plurality of weight bodies between said two side surfaces is determined so that each of said plurality of weight bodies is attached via an adhesive double-coated tape to the wheel with a sufficient adhesive strength even at a center of said width, said method comprising:
producing a bar material by any one of rolling, extruding and cutting;
punching said bar material by a punch and a die so that cut planes of said bar material are tapered by maintaining a distance between the punch and the die thereby manufacturing a plurality of weight bodies having tapered side surfaces; and
attaching said plurality of weight bodies to a first surface of a single adhesive double-coated coated tape, positioning said tapered surfaces of adjacent weight bodies towards each other.

* * * * *